(12) United States Patent
Graber

(10) Patent No.: US 8,564,349 B2
(45) Date of Patent: Oct. 22, 2013

(54) SQUARE WAVEFORM SHAPING DEVICE

(75) Inventor: Steffen Graber, Mannheim (DE)

(73) Assignee: Pepperl + Fuchs GmbH (DE)

( * ) Notice: Subject to any disclaimer, the term of this patent is extended or adjusted under 35 U.S.C. 154(b) by 589 days.

(21) Appl. No.: 12/747,012

(22) PCT Filed: Dec. 12, 2008

(86) PCT No.: PCT/IB2008/003688
§ 371 (c)(1),
(2), (4) Date: Jun. 9, 2010

(87) PCT Pub. No.: WO2009/074869
PCT Pub. Date: Jun. 18, 2009

(65) Prior Publication Data
US 2010/0264971 A1    Oct. 21, 2010

(30) Foreign Application Priority Data
Dec. 13, 2007  (GB) .................................. 0724237.3

(51) Int. Cl.
*H03K 5/02* (2006.01)
(52) U.S. Cl.
USPC ........................................................ 327/178
(58) Field of Classification Search
USPC ........................................................ 327/178
See application file for complete search history.

(56) References Cited

U.S. PATENT DOCUMENTS

| 3,174,090 A | 3/1965 | Hall |
| 5,446,921 A | 8/1995 | Tobler |
| 5,663,985 A | 9/1997 | Kogure |
| 7,136,003 B1 | 11/2006 | Ripley et al. |
| 2003/0023795 A1 | 1/2003 | Packwood et al. |
| 2005/0105897 A1* | 5/2005 | Wu et al. ........................ 388/804 |
| 2006/0192508 A1* | 8/2006 | Albers ........................... 318/128 |

FOREIGN PATENT DOCUMENTS

| EP | 0219962 A1 | 4/1987 |
| SU | 675551 A1 | 7/1979 |

OTHER PUBLICATIONS

International Search Report, PCT/IB2008/003688, dated Jul. 28, 2009.

* cited by examiner

*Primary Examiner* — Daniel Rojas
(74) *Attorney, Agent, or Firm* — Lerner, David, Littenberg, Krumholz & Mentlik, LLP

(57) ABSTRACT

A data signal generation device comprising a microprocessor and a digital potential divider, in which the microprocessor is adapted to generate a square wave output signal, and in which the digital potential divider is adapted to receive said square wave output signal, and to ramp up and down an output signal voltage and/or current according to state transitions in said square wave output signal.

19 Claims, 2 Drawing Sheets

SQUARE WAVEFORM SHAPING DEVICE

CROSS-REFERENCE TO RELATED APPLICATIONS

The present application is a national phase entry under 35 U.S.C. §371 of International Application No. PCT/IB2008/003688, filed Dec. 12, 2008, published in English, which claims the benefit of Great Britain Patent Application No. 0724237.3, filed Dec. 13, 2007. The disclosures of said applications are incorporated by reference herein.

BACKGROUND OF THE INVENTION

This invention relates to a data signal generation device, for use particularly, but not exclusively, as a Fieldbus signal repeater.

Fieldbus (or field bus) is the name of a family of industrial computer network protocols used for real-time distributed control, now standardized as IEC 61158. A complex automated industrial system, for example a fuel refinery, usually needs an organized hierarchy of controller systems to function. In this hierarchy there is a Human Machine Interface (HMI) at the top, where an operator can monitor or operate the system. This is typically linked to a middle layer of programmable logic controllers (PLC) via a non time critical communications system (e.g. Ethernet). At the bottom of the control chain is the fieldbus which links the PLCs to the components which actually do the work such as sensors, actuators, electric motors, console lights, switches, valves and contactors.

Fieldbus is often used in Intrinsically Safe environments, for example combustible atmospheres, and in particular gas group classification IIC, Hydrogen and Acetylene, and below, for example gas group IIB and IIA, for gas and/or dust. Using the Fieldbus protocol, field instruments and equipment in such an environment are controlled and monitored remotely via an electrical communications circuit often provided in the same electrical circuit as the power to drive the field instruments.

Fieldbus circuits are usually too large in size to support unrepeated data signals, so they comprise strategically positioned data signal repeaters to maintain the quality of the communications between the various devices. However, known Fieldbus signal repeating is usually performed by processor driven digital to analogue converters, analogue integrators, or diode clamped RC circuits. Such equipment is relatively power hungry, and it is expensive to manufacture and to purchase. With an Intrinsically Safe circuit power consumption is a critical factor in circuit design as it is always limited.

What is more, with the further development of the Fieldbus protocol in recent years, in communications and diagnostics in particular, the signal repeaters demand more and more power to perform more complex functions. Even with today's technology, the power and cost required to generate or repeat a good data signal is relatively high.

The present invention is intended to overcome some of the above problems.

BRIEF SUMMARY OF THE INVENTION

Therefore, according to the present invention a data signal generation device comprises a microprocessor and a digital potential divider, in which the microprocessor is adapted to generate a square wave output signal, and in which the digital potential divider is adapted to receive said square wave output signal, and to ramp up and down an output signal voltage and/or current according to state transitions in said square wave output signal.

Thus, the present invention allows a Fieldbus data signal to be generated without the use of an expensive and power hungry digital to analogue converter, or like known arrangement. A microprocessor like that referred to above uses power to process signals and perform other tasks in any event, and uses very little extra power to process a square wave data signal. A digital potential divider uses little power to automatically switch from one potential to another according to the square wave output signal.

It will be appreciated that the present invention can be employed for data signal generation by a field device or the system host. However, in an expedient version of the invention the device can be a data signal repeater adapted to receive an input signal. The microprocessor can be adapted to detect a binary meaning of the input signal, and to generate said square wave output signal according to the meaning of the input signal.

The microprocessor can detect the binary meaning of the input signal in any known way, but preferably this can be done by reference to zero crossing points in the input signal. Such elements of an input signal are used under the Fieldbus protocol to constitute binary bits. The square wave output signal can comprise state transitions according to said zero crossing points. As such, the binary incoming data signal is converted to a binary square wave form by the microprocessor.

In a preferred embodiment, the microprocessor can be provided with a clock means, and can be adapted to generate a square wave output signal with timing determined by said clock means. This arrangement eliminates timing errors from input signals, which are common. It will be appreciated that a degree of processing is required to determine and correct a timing error, so in one version of the invention the microprocessor can perform a buffering time-delay function between receiving the input signal and outputting the square wave output signal.

The ramping up and down of the output signal voltage and/or current can be performed in any way, however preferably the digital potential divider can be adapted to ramp up and down an output signal voltage by one volt peak to peak, according to ceiling and a floor set point voltages. This is appropriate for a Fieldbus system.

BRIEF DESCRIPTION OF THE DRAWINGS

The invention can be performed in various ways, but two embodiments will now be described by way of example and with reference to the accompanying drawings, in which.

DETAILED DESCRIPTION

Figure 1:
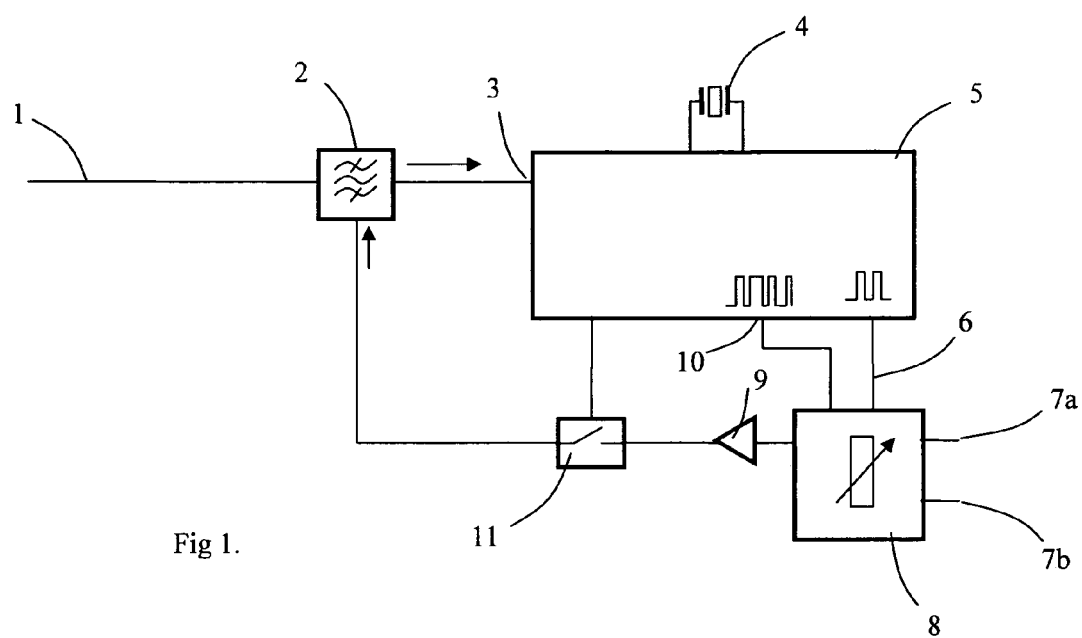
FIG. 1 is a diagrammatic view of a first data signal generation device according to the invention
Figure 2:
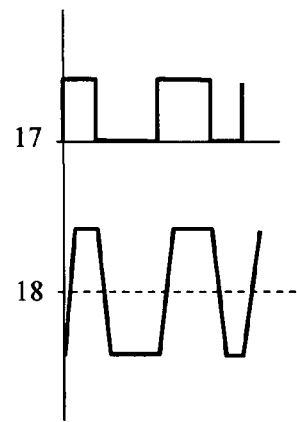
FIG. 2 is a diagrammatic view of data signals generated by the data signal generation device shown in FIG. 1.

As shown in FIG. 1, a data signal generation device, which in this case is incorporated into a field device (not shown), comprises a microprocessor 5 and a digital potential divider 8. The microprocessor 5 is adapted to generate a square wave output signal 17, as shown in FIG. 2, and as described further below the digital potential divider 8 is adapted to receive said square wave output signal 17, and to ramp up and down an output signal voltage and/or current 18 according to state transitions in said square wave output signal 17.

The field device is mounted on a trunk 1, along which it communicates with a host system in the known way. Incoming data signals pass through filter 2, and enter an input 3. To communicate with the host system the microprocessor 5 generates square wave Manchester encoded TTL binary telegram data signals 17, as shown in FIG. 2, which relate to the operation of the field device, for example status or diagnostics signals. Such square wave data signals 17 cannot be sent down the trunk 1 because they are incompatible with the Fieldbus protocol, and in particular such a harsh digital waveform causes the formation of digital spikes and the like.

Therefore, the square wave data signals 17 are sent at 10 to the digital potential divider 8. This automatically ramps up and down a provided voltage to generate an output voltage 18 according to the state transitions in the square wave data signals 17, as is illustrated in FIG. 2. The timing of the sequence is governed by a clock frequency, which is provided to the digital potential divider 8 from the microprocessor 5, as shown at 6. In order to do this the microprocessor 5 is clocked, as shown at 4. The ramping up and down reaches to a ceiling and a floor which are set by voltage points 7a and 7b. The voltage remains at that set point until the next transition. The digital potential divider 8 generates approximately one volt peak to peak or so.

The output signal voltage 18 is then buffered at 9 and a switch 11 is closed by the microprocessor 5 in order to send the outputted data telegram to the trunk 1, via the filter 2.

Referring to FIG. 2, the output signal voltage 18 comprises a trapezoidal signal which is compatible with the Fieldbus protocol. In particular it has sloping sides which do not generate undue spikes.

Figure 3:
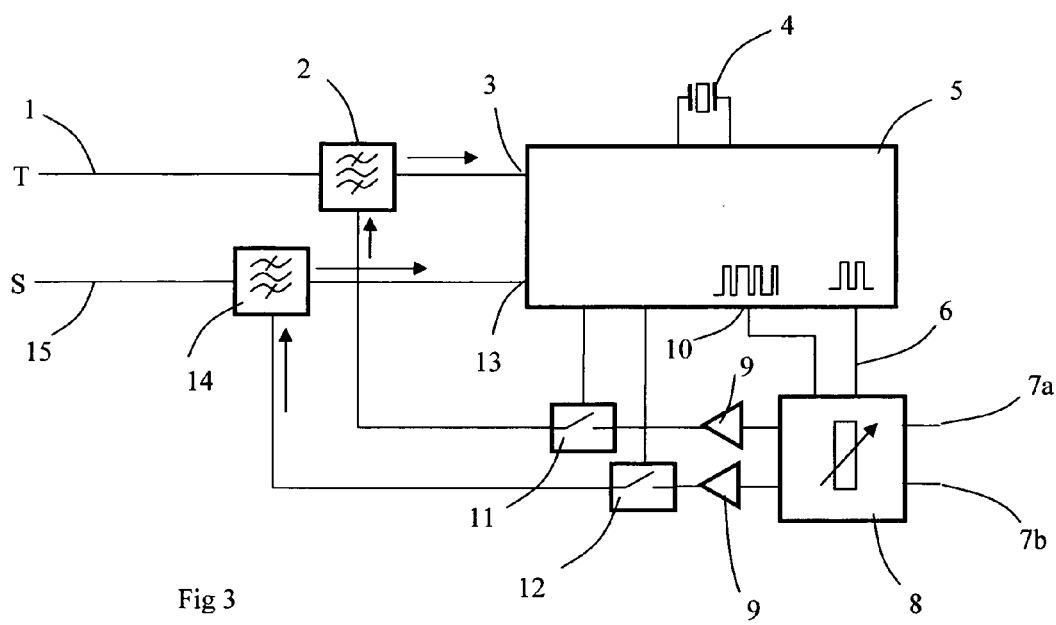
FIG. 3 is a diagrammatic view of a second data signal generation device according to the invention.

FIG. 3 shows a data signal repeater which utilises the same arrangement as described above to repeat Fieldbus data signals. Where components are the same as those in FIG. 1, like reference numbers have been used.

The repeater is mounted on a trunk 1 and a spur 15, and repeats data signals from the trunk 1 to the spur 15 and visa versa. When input signals come from the trunk 1 they pass through filter 2 and are inputted to the microprocessor 5 at input 3. An output signal voltage 18 is sent to the spur 15 by closing switch 12. Likewise, when input signals come from the spur 15, they pass through filter 14 and are inputted to the microprocessor 5 at input 13. An output signal voltage 18 is sent to the trunk 1 by closing switch 11.

Figure 4:
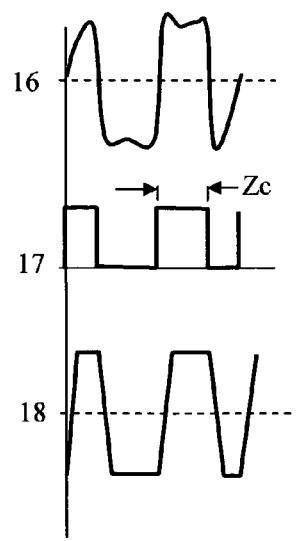
FIG. 4 is a diagrammatic view of data signals received and generated by the data signal generation device shown in FIG. 3.

The typical waveform of input signals 16 is shown in FIG. 4. This type of waveform is the result of deterioration over the length of cable. Both the shape and timing of the waveform 16 are low quality. However, the microprocessor 5 is programmed to detect the meaning of an input signal 16 by referring to the zero crossing points therein, which combine to create a binary data telegram. Such technology is known.

The microprocessor then generates a square wave data signal 17 which comprises state transitions according to the detected zero crossing points of the input data signal 16, as illustrated in FIG. 4. As above, this type of square wave data signal 17 cannot be sent down the trunk 1 or the spur 15 because it is incompatible with the Fieldbus protocol. Instead the square wave data signal 17 is sent at 10 to the digital potential divider 8, which automatically ramps up and down a provided voltage to generate an output voltage 18 according to the state transitions in the square wave data signal 17, again as is illustrated in FIG. 4. The ramping up and down reaches to a ceiling and a floor which are set by voltage points 7a and 7b, and the voltage remains at that set point until the next transition. The digital potential divider 8 generates approximately one volt peak to peak across the 50 Ohm Fieldbus load.

The output signal voltage 18 is then directed to the trunk 1 or the spur 15 as appropriate by closing either switch 11 or 12. In each case the signal 18 is buffered at 9, and passes through filter 2 or 14.

Referring to FIG. 4, the output signal voltage 18 comprises a trapezoidal signal which is compatible with the Fieldbus protocol. In particular it has sloping sides which do not generate undue spikes.

In the above described arrangement the output signal voltage 18 is produced simultaneously with the input data signal 16. This is not ideal because errors in the timing of the input data signal 16 can be carried over to the output signal voltage 18. Therefore, in a preferred manner of operation, the microprocessor 5 has a buffering stage in which it re-times the bit spans according to the clock 4. This buffering stage can extend for a few bits to allow the microprocessor sufficient processing time.

Figure 5:
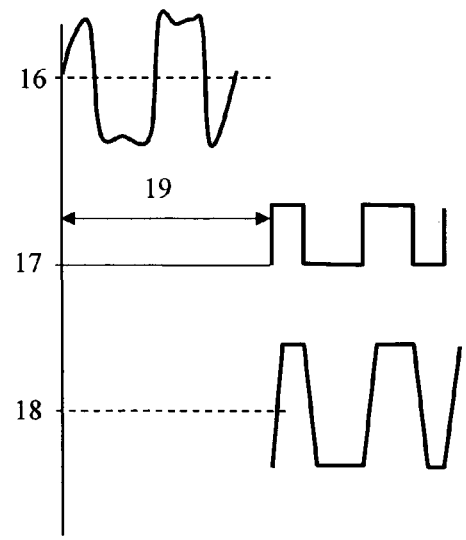
FIG. 5 is a diagrammatic view of alternative data signals received and generated by the data signal generation device shown in FIG. 3.

FIG. 5 illustrates this mode of operation, in which a five bit buffering time 19 occurs before the square wave data signal 17 is begun. However, the output signal voltage 18 is both re-shaped and re-timed in comparison with the input data signal 16.

The embodiments described above can be altered without departing from the scope of the Claims. For example in one alternative embodiment (not shown) the digital potential divider ramps up and down an electrical current to generate an output signal current. With such a construction the output signal current can be output to both the trunk and the spur, and there is no need for switches 11 and 12.

Therefore, the invention provides a cheap and low power Fieldbus repeater, which accurately re-shapes and re-times distorted data signals.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An IEC 61158 Fieldbus data signal generation device comprising a microprocessor and a digital potential divider, in which the device is a Fieldbus device which complies with the ICE 61158 Fieldbus protocol, in which the microprocessor is adapted to generate a square wave binary telegram data signal, wherein the digital potential divider is adapted to receive said square wave binary telegram data signal, and to ramp up and down an output signal voltage and/or current thereof according to state transitions in said square wave binary telegram data signal, such that said digital potential divider generates a trapezoidal data telegram, on said output signal voltage and/or current which is compatible with the ICE 61158 Fieldbus protocol.

2. The IEC 61158 Fieldbus data signal generation device as claimed in claim 1 in which the device is a data signal repeater adapted to receive an input binary telegram data signal, in which the microprocessor is adapted to detect a binary meaning of the input signal, and to generate said square wave binary telegram data signal according to the meaning of the input binary telegram data signal.

3. The IEC 61158 Fieldbus data signal generation device as claimed in claim 2 in which the digital potential divider is adapted to ramp up and down an output signal voltage by one volt peak to peak, according to a ceiling and a floor set point voltages.

4. The IEC 61158 Fieldbus data signal generation device as claimed in claim 2 in which the microprocessor detects the binary meaning of the input binary telegram data signal by reference to zero crossing points therein, and in which the square wave binary telegram data signal comprises state transitions according to said zero crossing points.

5. The IEC 61158 Fieldbus data signal generation device as claimed in claim 4 in which the digital potential divider is adapted to ramp up and down an output signal voltage by one volt peak to peak, according to a ceiling and a floor set point voltages.

6. The IEC 61158 Fieldbus data signal generation device as claimed in claim 4 in which the microprocessor is provided with a clock means, and is adapted to generate said square wave binary telegram data signal with timing determined by said clock means.

7. The IEC 61158 Fieldbus data signal generation device as claimed in claim 6 in which the digital potential divider is adapted to ramp up and down an output signal voltage by one volt peak to peak, according to a ceiling and a floor set point voltages.

8. The IEC 61158 Fieldbus data signal generation device as claimed in claim 1 in which the digital potential divider is adapted to ramp up and down an output signal voltage by one volt peak to peak, according to a ceiling and a floor set point voltages.

9. An IEC 61158 Fieldbus data signal generation device comprising a microprocessor and a digital potential divider in which the device is a Fieldbus device which complies with the IEC 61158 Fieldbus protocol, in which the microprocessor is adapted to generate a square wave binary telegram data signal, wherein the digital potential divider is adapted to receive said square wave binary telegram data signal, and to ramp up and down an output signal voltage and/or current according to state transitions in said square wave binary telegram data signal and in which the device is a data signal repeater adapted to receive an input signal, in which the microprocessor is adapted to detect a binary meaning of the input signal, and to generate said square wave binary telegram data signal according to the meaning of the input signal.

10. The IEC 61158 Fieldbus data signal generation device as claimed in claim 9 in which the microprocessor detects the binary meaning of the input signal by reference to zero crossing points therein, and in which the square wave binary telegram data signal comprises state transitions according to said zero crossing points.

11. The IEC 61158 Fieldbus data signal generation device as claimed in claim 10 in which the digital potential divider is adapted to ramp up and down an output signal voltage by one volt peak to peak, according to a ceiling and a floor set point voltages.

12. The IEC 61158 Fieldbus data signal generation device as claimed in claim 10 in which the output signal voltage and/or current is compatible with the IEC 61158 Fieldbus protocol.

13. The IEC 61158 Fieldbus data signal generation device as claimed in claim 10 in which the microprocessor is provided with a clock means, and is adapted to generate a square wave binary telegram data signal with timing determined by said clock means.

14. The IEC 61158 Fieldbus data signal generation device as claimed in claim 13 in which the digital potential divider is adapted to ramp up and down an output signal voltage by one volt peak to peak, according to a ceiling and a floor set point voltages.

15. The IEC 61158 Fieldbus data signal generation device as claimed in claim 13 in which the output signal voltage and/or current is compatible with the IEC 61158 Fieldbus protocol.

16. The IEC 61158 Fieldbus data signal generation device as claimed in claim 9 in which the output signal voltage and/or current is compatible with the IEC 61158 Fieldbus protocol.

17. The IEC 61158 Fieldbus data signal generation device as claimed in claim 9 in which the digital potential divider is adapted to ramp up and down an output signal voltage by one volt peak to peak, according to a ceiling and a floor set point voltages.

18. The IEC 61158 Fieldbus data signal generation device as claimed in claim 9 in which the digital potential divider is adapted to ramp up and down an output signal voltage by one volt peak to peak, according to a ceiling and a floor set point voltages.

19. The IEC 61158 Fieldbus data signal generation device as claimed in claim 9 wherein said digital potential divider generates a trapezoidal data telegram on said output signal voltage and/or current which is compatible with the IEC 61158 Fieldbus protocol.

* * * * *